US010215143B2

(12) United States Patent
Klesse et al.

(10) Patent No.: US 10,215,143 B2
(45) Date of Patent: Feb. 26, 2019

(54) PRESSURE-LIMITING VALVE FOR A FUEL INJECTION SYSTEM AND FUEL INJECTION SYSTEM

(71) Applicant: Continental Automotive GmbH, Hannover (DE)

(72) Inventors: Christoph Klesse, Woerth A.D. Donau (DE); Tobias Ritsch, Regensburg (DE); Robert Wiench, Barbing (DE); Michael Wirkowski, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 14/772,248

(22) PCT Filed: Sep. 29, 2014

(86) PCT No.: PCT/EP2014/070834
§ 371 (c)(1),
(2) Date: Sep. 2, 2015

(87) PCT Pub. No.: WO2015/055411
PCT Pub. Date: Apr. 23, 2015

(65) Prior Publication Data
US 2016/0215743 A1     Jul. 28, 2016

(30) Foreign Application Priority Data
Oct. 15, 2013  (DE) .................. 10 2013 220 816

(51) Int. Cl.
*F02M 59/46*  (2006.01)
*F02M 63/02*  (2006.01)
*F16K 15/02*  (2006.01)

(52) U.S. Cl.
CPC ...... *F02M 59/462* (2013.01); *F02M 63/0215* (2013.01); *F16K 15/026* (2013.01); *F02M 2200/18* (2013.01)

(58) Field of Classification Search
CPC ... F16K 17/164; F16K 15/026; F02M 59/462; F02M 63/0215; F02M 2200/18
(Continued)

(56) References Cited

U.S. PATENT DOCUMENTS 2,071,749 A * 2/1937 Knight ................. A62C 35/645
                                                                  137/467
2,217,880 A * 10/1940 Woodson ................. F16K 17/00
                                                                  137/115.13
(Continued)

FOREIGN PATENT DOCUMENTS

CN     2232101 Y     7/1996     ............. F16K 15/00
DE  19621021 A1   10/1997     ............. F02M 55/02
(Continued)

OTHER PUBLICATIONS

Akita Tatsuhiko, Translation of JP2012188960 A, Oct. 4, 2012.*
(Continued)

*Primary Examiner* — P. Macade Nichols
(74) *Attorney, Agent, or Firm* — Slayden Frubert Beard PLLC

(57) ABSTRACT

A pressure-limiting valve for a fuel injection system includes a housing having a fluid inlet and a fluid outlet, a sealing seat, and a sealing body configured to move between a closed position in which the sealing body is in contact with the sealing seat, which blocks fluid flow from the fluid inlet to the fluid outlet, and additional positions that permit such fluid flow, and a holding device for keeping the sealing body
(Continued)

in one of the additional positions if the sealing body is moved at least a specified distance away from the sealing seat.

7 Claims, 2 Drawing Sheets

(58) Field of Classification Search
USPC ............ 137/522, 523, 467; 251/65, 85, 116
See application file for complete search history.

(56) References Cited

U.S. PATENT DOCUMENTS

| | | | | |
|---|---|---|---|---|
| 3,164,164 | A * | 1/1965 | Cordes | F16K 17/04 |
| | | | | 137/467 |
| 3,199,523 | A * | 8/1965 | McEathron | F01L 1/00 |
| | | | | 116/70 |
| 3,288,578 | A * | 11/1966 | Witt | F16K 17/19 |
| | | | | 137/467 |
| 3,434,494 | A * | 3/1969 | Upper | F16K 15/026 |
| | | | | 137/467 |
| 6,536,413 | B2 | 3/2003 | Mori | 123/467 |
| 7,234,486 | B2 | 6/2007 | Ressel et al. | 137/469 |
| 7,661,410 | B1 | 2/2010 | Fuelberth et al. | 123/467 |
| 2008/0156290 | A1 | 7/2008 | Ochiai | 123/198 DB |
| 2016/0215743 | A1 * | 7/2016 | Klesse | F02M 63/0215 |

FOREIGN PATENT DOCUMENTS

| | | | | |
|---|---|---|---|---|
| DE | 10135352 | A1 | 1/2002 | F02M 37/00 |
| DE | 102008059638 | A1 | 6/2010 | F04B 49/03 |
| DE | 102011083628 | A1 | 3/2013 | F02M 63/00 |
| EP | 1411238 | A1 | 4/2004 | F02M 37/00 |
| JP | 2012188960 | A | 10/2012 | F02M 55/00 |
| WO | 2002/077446 | A1 | 10/2002 | F02M 63/02 |
| WO | 2015/055411 | A1 | 4/2015 | F02M 63/02 |

OTHER PUBLICATIONS

German Office Action, Application No. 102013220816.2, 5 pages, dated May 16, 2014.
International Search Report and Written Opinion, Application No. PCT/EP2014/070834, 13 pages, dated Jan. 5, 2015.
Korean Office Action, Application No. 9-5-2016-044318542, 10 pages, dated Jun. 20, 2016.
Chinese Office Action, Application No. 201480011529.1, 14 pages, dated Mar. 2, 2017.
Chinese Office Action, Application No. 201480011529.1, 11 pages, dated Jul. 28, 2017.

* cited by examiner

PRESSURE-LIMITING VALVE FOR A FUEL INJECTION SYSTEM AND FUEL INJECTION SYSTEM

CROSS-REFERENCE TO RELATED APPLICATIONS

This application is a U.S. National Stage Application of International Application No. PCT/EP2014/070834 filed Sep. 29, 2014, which designates the United States of America, and claims priority to DE Application No. 10 2013 220 816.2 filed Oct. 15, 2013, the contents of which are hereby incorporated by reference in their entirety.

TECHNICAL FIELD

The invention relates to a pressure-limiting valve for a fuel injection system, in particular for a fuel injection system for an internal combustion engine for a motor vehicle. The invention further relates to a fuel injection system comprising such a pressure-limiting valve.

BACKGROUND

High pressure pumps for fuel injection systems conventionally have a pressure-limiting valve (also called a pressure control valve or pressure relief valve). This is generally coupled to the high pressure pump such that it is hydraulically locked. "Hydraulically locked" means that the pressure-limiting valve discharges into a pump chamber of the high pressure pump. Accordingly, during the pump delivery stroke the pressure-limiting valve is hydraulically locked and is not able to open. In order to avoid losses in terms of efficiency, the opening pressure of the pressure-limiting valve is adjusted so that it does not open during normal operation of the internal combustion engine. In the event of a fault resulting in a full pump delivery, system pressures may occur which are considerably outside the specified high pressure range. As a result, for example, the injection valves are no longer able to open. An operation of the motor vehicle is no longer possible or could lead to damage, for example, to the catalytic converter.

SUMMARY

One embodiment provides a pressure-limiting valve for a fuel injection system comprising: a housing which has a fluid inlet and a fluid outlet, a sealing seat and a sealing body for blocking a fluid flow from the fluid inlet to the fluid outlet in a closed position in which the sealing body is in contact with the sealing seat and for permitting said fluid flow in additional positions, and a holding device for keeping the sealing body in one of the additional positions if the sealing body is moved at least a specified distance away from the sealing seat.

In a further embodiment, the holding device holds the sealing body irreversibly in the additional position.

In a further embodiment, the holding device holds the sealing body reversibly in the additional position.

In a further embodiment, the holding device is designed to hold the sealing body magnetically in the additional position.

In a further embodiment, the holding device is designed to hold the sealing body mechanically in the additional position.

In a further embodiment, the specified distance is predetermined as a function of a maximum admissible pressure for the fuel injection system.

Another embodiment provides a fuel injection system, comprising a pressure limiting valve as disclosed above, and a high pressure pump having a pump chamber which is arranged hydraulically between a high pressure region and a low pressure region, wherein the pressure-limiting valve is connected hydraulically to the high pressure region by the fluid inlet.

In a further embodiment, the fluid outlet of the pressure-limiting valve is hydraulically connected to the pump chamber.

In a further embodiment, the fluid outlet of the pressure limiting valve is connected hydraulically to the low pressure region.

In a further embodiment, the fuel injection system comprises a fuel collection line which is hydraulically coupled to the high pressure region of the high pressure pump, wherein the specified distance is predetermined as a function of the fuel collection line.

BRIEF DESCRIPTION OF THE DRAWINGS

Example embodiments are discussed in detail below with reference to the drawings, in which.

DETAILED DESCRIPTION

Figure 1:
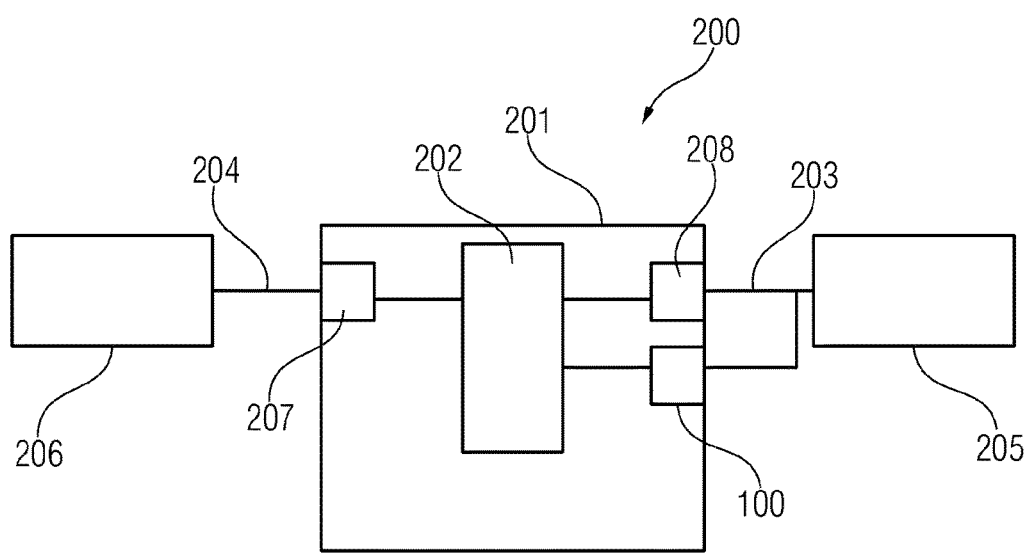
FIG. 1 shows a schematic view of a fuel injection system according to embodiments.

Embodiments of the invention provide a pressure-limiting valve which, even in the event of a fault in the high pressure pump, reliably permits at least a minimal operation of the motor vehicle. Other embodiments provide a fuel injection system which, even in the event of a fault in the high pressure pump, reliably permits at least a minimal operation of the motor vehicle.

According to one embodiment, a pressure-limiting valve for a fuel injection system comprises a housing, a fluid inlet and a fluid outlet. The pressure-limiting valve has a sealing seat and a sealing body for blocking fluid flow from the fluid inlet to the fluid outlet in a closed position and for permitting the fluid flow in additional positions. The pressure-limiting valve has a holding device for keeping the sealing body in one of the additional positions if the sealing body is moved at least a specified distance away from the sealing seat.

By means of the holding device it is possible to keep open the pressure-limiting valve permanently and permit the fluid flow permanently from the fluid inlet to the fluid outlet. By means of the holding device it is possible to hold the pressure-limiting valve open irrespective of the prevailing pressures. By means of the holding device it is possible to avoid closing the pressure-limiting valve. The holding device is designed, in particular, such that it keeps the sealing body in the additional position if, in the event of a fault in the high pressure pump, a full delivery at one hundred percent occurs. This happens, for example, if the spring is broken on the digital inlet valve of the high pressure pump or if the digital inlet valve has an electrical fault. In these cases, the high pressure pump still operates as a constant pump as a function of the rotational speed. Due to the very high volumetric flow the sealing body in this case is considerably deflected. In particular, the sealing body in this case is deflected at least by the specified distance. In normal operation, the sealing body is deflected, in particular, to a lesser extent than the specified distance. If the sealing body is deflected to a lesser extent than the specified distance the sealing body is not held by the holding device. In normal operation the sealing body is not held by the holding device.

In the event of a fault resulting in a pump delivery of one hundred percent, the holding device holds the sealing body in the fully deflected position. This results in a permanent leakage. The pressure-limiting valve is also no longer closed during the suction stroke of the high pressure pump. Thus it is possible to reduce the pressure in the fuel injection system by means of the pressure-limiting valve, in particular to the pressure which is provided by the presupply pump. Thus, even in the event of a fault, the system pressure is known. In particular, this known system pressure is between 5 and 7 bar and corresponds to the pressure which is provided by the presupply pump. Thus at least one injection of fuel is possible at a supply pressure of 5 to 7 bar. As a result, a sufficient quantity of fuel is able to be injected in order to be able to call upon approximately 20 to 30% of the full load power of the engine. Thus at least an emergency operation of the internal combustion engine is possible in a reliable manner. The injection valves are able to open in a reliable manner.

By means of the holding device a simple and cost-effective option is provided to permit a low-pressure emergency operation of the internal combustion engine, if a fault occurs resulting in a full delivery of the high pressure pump at one hundred percent. As a result, in the case of a fault the internal combustion engine is prevented from having to be switched off immediately after the occurrence of the fault. Additionally, the injectors and control unit for activating the injectors may be of simple design and construction. It is not necessary to design the injectors for high pressures, for example above 350 bar.

According to further embodiments, the holding device holds the sealing body irreversibly in the additional position. The sealing body no longer leaves the additional position. As the high pressure pump, however, in any case has suffered damage which has led to the occurrence of the fault, the pump in any case has to be replaced. The irreversible holding of the sealing body, however, permits the pressure to be reduced in a reliable manner and avoids further pressure build-up.

According to further embodiments, the holding device holds the sealing body reversibly. After the holding body has been held by the holding device in the additional position, it leaves the additional position again and is forced, for example by a spring, into the closed position. Thus, even in the case of a fault, it is possible to increase the pressure again in the fuel injection system above the low pressure of the presupply pump. As soon as the pressure is sufficiently high again for the valve body to be displaced as far as the additional position over the specified distance, the sealing body is in turn held by the holding device for a specific time interval in order for the pressure to be reduced in a reliable manner.

According to further embodiments, the holding body is designed to hold the sealing body magnetically in the additional position. According to further embodiments again, the holding device is designed to hold the sealing body mechanically in the additional position. According to further embodiments again, the holding device holds the sealing body in a different manner in the additional position. Moreover, it is possible to combine different forces in order to hold the sealing body, for example a combination of magnetic forces and frictional forces.

According to further embodiments, the specified distance is predetermined as a function of a maximum admissible pressure for the fuel injection system. The greater the maximum admissible pressure for the fuel injection system, the greater the specified distance which is predetermined. For example, the specified distance is predetermined such that the holding device keeps the sealing body in the additional position if a pressure of 300 bar is exceeded in a fuel collection line.

According to a further embodiment, a fuel injection system comprises a pressure-limiting valve according to at least one of the disclosed embodiments. The fuel injection system has a high pressure pump having a pump chamber which is arranged hydraulically between a high pressure region and a low pressure region. The pressure-limiting valve is connected hydraulically to the high pressure region by the fluid inlet. According to embodiments, the fluid outlet of the pressure-limiting valve is hydraulically connected to the pump chamber. Thus the pressure-limiting valve is hydraulically locked in normal operation. However, as soon as the holding device holds the sealing body in the additional position, a hydraulic locking is prevented by the holding device and it is possible to reduce the pressure in a rapid and reliable manner.

According to further embodiments, the fluid outlet of the pressure-limiting valve is connected to the low pressure region. Thus an opening of the pressure-limiting valve is even possible during the delivery stroke of the high pressure pump.

The fuel injection system according to further embodiments comprises a fuel collection line (also called a common rail) which is hydraulically coupled to the high pressure region of the high pressure pump. The specified distance is predetermined as a function of the fuel collection line. According to further embodiments, the specified distance is predetermined as a function of further elements of the fuel injection system.

FIG. 1 shows a fuel injection system 200. The fuel injection system 200 is, in particular, a fuel injection system for an internal combustion engine of a motor vehicle. The fuel injection system 200 has a high pressure pump 201 for delivering a fluid, in particular for delivering petrol or diesel. The fuel injection system 200 has a fluid tank 206 and a fuel collection line 205. The high pressure pump 201 is designed to deliver fluid from the fluid tank 206 to the fuel collection line 205 when subjected to pressure. The high pressure pump 201 is coupled to the fluid tank 206 at a low pressure region 204. The high pressure pump 201 is coupled to the fuel collection line 205 by a high pressure region 203. The fuel collection line 205 is coupled to the injection valves. The injection valves serve for injecting the fluid from the fuel collection line 205 into the combustion chambers of the internal combustion engine respectively assigned thereto.

The high pressure pump 201 has a pump chamber 202. The pump chamber 202 is arranged between the low pressure 204 and the high pressure region 203. For example, the high pressure pump 201 is a piston pump in which a piston moves with reciprocating motion in the pump chamber 202 in order to suction the fluid from the fluid tank 206 and to deliver said fluid to the fuel collection line 205. An inlet valve 207 is arranged between the fluid tank 206 and the pump chamber 202. An outlet valve 208 is arranged between the pump chamber 202 and the fuel collection line 205.

According to embodiments, a pressure-limiting valve 100 is arranged hydraulically in parallel with the outlet valve 208. According to further embodiments, the pressure-limiting valve is not hydraulically coupled on the output side to the pump chamber 202 as shown in FIG. 1 but directly to the low pressure region 204. The pressure-limiting valve protects the high pressure region and, in particular the fuel collection line 205, from inadmissibly high pressures. Inadmissibly high pressures occur, for example, in the case of a fault in the high pressure pump 201. For example, a faulty inlet valve 207 may lead to inadmissibly high pressures in the high pressure region 203.

The inlet valve 207 is, in particular, a so-called digital inlet valve which may also be held open during the delivery stroke of the high pressure pump 201. Thus a partial delivery of the high pressure pump 201 is able to be implemented at a delivery rate of less than 100%. If, for example, the spring is broken at the inlet valve 207 or the inlet valve 207 has an electrical fault, it is no longer possible to hold open the inlet valve 207 during the delivery stroke of the high pressure pump 201. Thus only a full delivery of the high pressure pump 201 is possible at a one hundred percent delivery rate.

Figure 2:
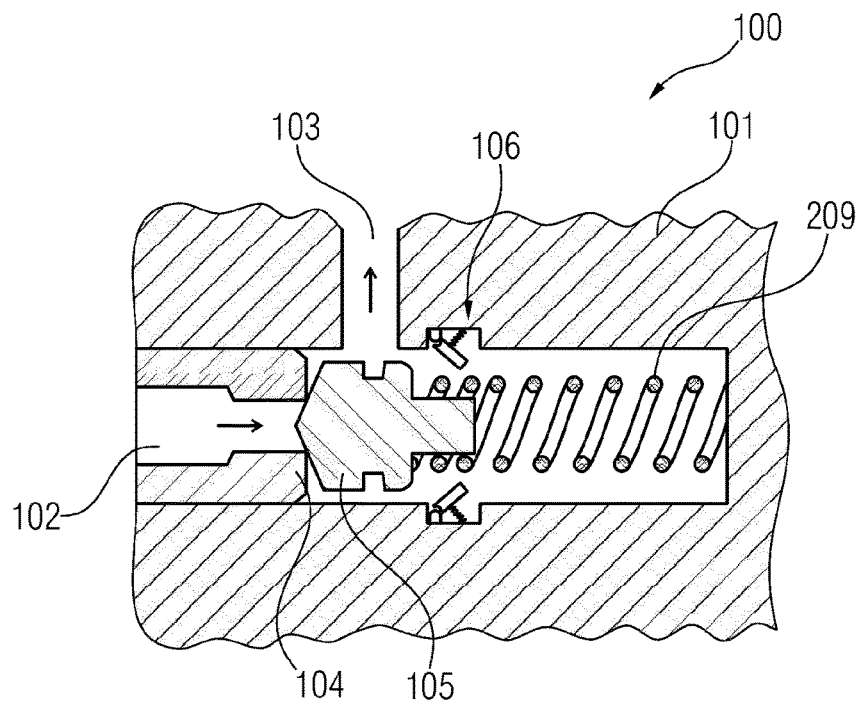
FIG. 2 shows a schematic view of a pressure-limiting valve in the closed position according to embodiments.

FIG. 2 shows a schematic view of the pressure-limiting valve 100 according to embodiments. The pressure-limiting valve 100 has a housing 101. For example, the housing 101 is the pump housing of the high pressure pump 201. The pressure-limiting valve 100 has a fluid inlet 102. The fluid inlet 102 is, in particular, connected to the high pressure region 203. The pressure-limiting valve 100 has a fluid outlet 103. According to embodiments, the fluid outlet 103 is hydraulically connected to the pump chamber 202. According to further embodiments, the fluid outlet 103 is hydraulically connected to the low pressure region 204. The pressure-limiting valve 100 has a sealing seat 104. The sealing seat 104 cooperates with a sealing body 105 of the pressure-limiting valve 100. For example, the sealing body 105 is forced by a spring 209 in the direction of the sealing seat 104. If the sealing body 105 is in contact with the sealing seat 104, the pressure-limiting valve 100 is in its closed position. Fluid is prevented from flowing from the fluid inlet 102 to the fluid outlet 103. The sealing body 105 is able to be moved away from the sealing seat 104 counter to the spring force of the spring 209. If the sealing body 105 is arranged at a distance from the sealing seat 104, a fluid flow is permitted from the fluid inlet 102 to the fluid outlet 103. If the fluid flow is permitted, fluid is discharged from the high pressure region 203 and, in particular, from the fuel collection line 205, and thus the pressure in the high pressure region 203 is reduced. The pressure-limiting valve 100 has a holding device 106. The holding device 106 is designed to fix the sealing body 105 in a position which is different from the closed position, spaced apart from the sealing seat 104 irrespective of the prevailing pressures.

In the embodiments in which the fluid outlet 103 is hydraulically connected to the pump chamber 202, the pressure-limiting valve 100 is hydraulically locked. The pressure-limiting valve 100 is hydraulically locked during the delivery stroke. The opening pressure of the pressure-limiting valve 100 is designed such that it does not open during normal operation of the internal combustion engine. Thus the high pressure pump 201 is able to be very efficient. During the suction phase of the high pressure pump 201 it is possible that the fluid flow is permitted from the fluid inlet 102 to the fluid outlet 103 and thus the pressure in the high pressure region 203 is reduced. In normal operation (for example during so-called heating-up and/or the so-called hot soak) the sealing body 105 is deflected by only a few micrometers from the sealing seat 104 in order to reduce the overpressure.

In the event of a fault in the pump, in particular if a full delivery at one hundred percent occurs, a very high volumetric flow is present. The volumetric flow leads to a greater deflection of the sealing body 105 away from the sealing seat 104 than in normal operation.

Figure 3:
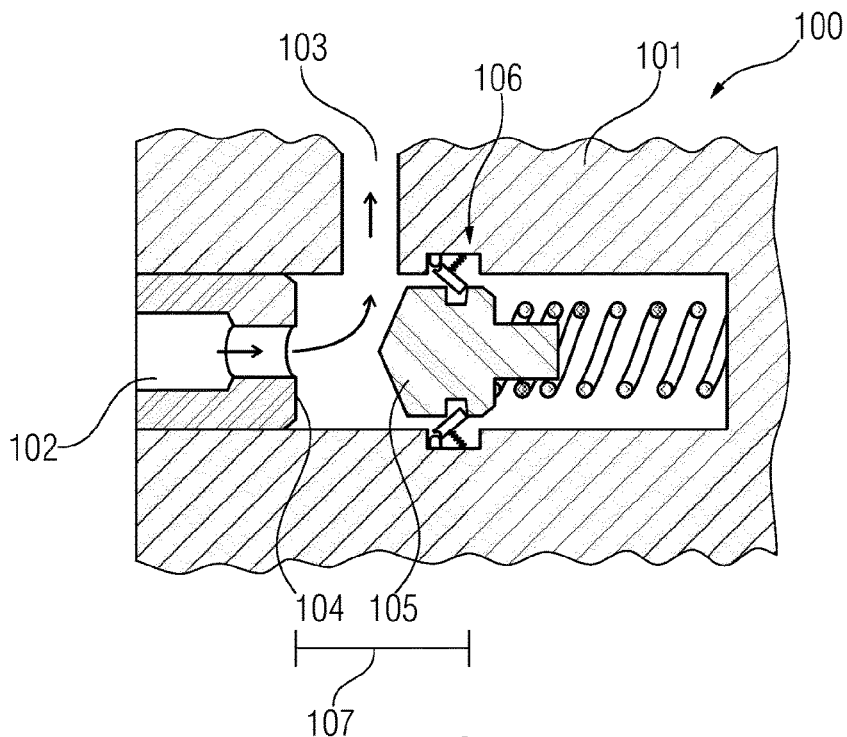
FIG. 3 shows a schematic view of the pressure-limiting valve in an additional position according to embodiments.

FIG. 3 shows the pressure-limiting valve 100 in the event of a fault in the high pressure pump 201 with a full delivery at one hundred percent. Due to the high volumetric flow, the sealing body 105 has been moved a specified distance 107 away from the sealing seat 104. Thus the sealing body 105 enters the effective region of the holding device 106 of the pressure-limiting valve 100. The holding device 106 is designed to hold the sealing body 105 and to prevent the sealing body 105 from moving back in the direction of the sealing seat. If the sealing body 105 is held by the holding device 106, the closed position of the pressure-limiting valve 100 is avoided. The fluid flow from the fluid inlet 102 to the fluid outlet 103 is thus always permitted, in particular even during the delivery stroke of the high pressure pump 201. The holding device 201 holds the sealing body, for example mechanically, as shown in FIG. 3. To this end, the holding device 106 has, for example, resiliently deflectable levers which engage in a groove of the sealing body 105 in order to hold said sealing body. According to further embodiments, the holding device 106 has magnetic holding elements in order to hold the sealing body 105 spaced apart from the sealing seat 104 by means of magnetic forces. According to further embodiments, the holding device 106 has further elements in order to hold the sealing body 105 spaced apart from the sealing seat 104 by means of different forces. A combination of different holding forces is also possible.

By means of the holding device 106 the sealing body 105 is fixed in the fully deflected position, in the case of a fault in the pump with a pump delivery at one hundred percent. A permanent flow of fluid is produced by the sealing body being fixed. The pressure-limiting valve 100 is also no longer able to be closed during the delivery stroke of the high pressure pump 201. As a result, the pressure in the high pressure region 203 drops very rapidly, in particular to the pressure which is provided by a presupply pump which, for example, is arranged in the fluid tank 206. Thus, even in the case of a fault in the pump with a full delivery at one hundred percent, a defined state is present by which the fuel injection system 200 and the internal combustion engine may be operated. The quantity of fuel which is injected is known. As a result, for example, the catalytic converter may be prevented from being destroyed. A reliable opening of the injectors is possible. Additionally, a high pressure sensor which is able to detect reliable measurement values, even at pressures of over 300 bar, may be dispensed with. An operation of the internal combustion engine in the region of approximately 20 to 30% of the full load power is possible by operating at the system pressure of the presupply pump of approximately 5 to 7 bar. Thus it is possible to drive to a garage, for example, even in the case of a fault in the pump. Thus the availability of the motor vehicle is increased.

In conventional pressure-limiting valves without a holding device, in the case of a fault in the pump with a full delivery at one hundred percent, due to very high pressures in the fuel collection line it is not possible to reduce the pressure and to maintain it permanently at the system pressure of the presupply pump of approximately 5 to 7 bar. Therefore, in the event of a fault the motor vehicle has to be switched off in the customary manner. An emergency operation is not possible.

The specified distance 107 is fixed as a function of the components of the fuel injection system 200. The deflected position from which the sealing body 105 is fixed by the holding device 106 is predetermined, in particular, according to a maximum admissible pressure in the high pressure region 203 and/or in the fuel collection line 205. For example, the specified distance 107 is predetermined such that at a pressure of 300 bar or more in the fuel collection line 205 the sealing body 105 is deflected sufficiently far that it is held by the holding device 106.

In normal operation, for example, pressures of approximately 200 bar are provided. According to further embodiments, the sealing body 105 is held by the holding device 106 at other pressures in the fuel collection line 205, for example at a pressure of 250 bar in the fuel collection line 205, if pressures of approximately 150 bar are provided in normal operation.

As the holding device 106 holds the sealing body 105 over a lengthy time period, in particular even during the delivery stroke of the high pressure pump 201, a slow response time of the pressure-limiting valve 100, in particular of the sealing body 105, is no longer relevant in terms of reducing the pressure on the high pressure side 203. In conventional valves without the holding device 106, even in the event of a fault during the delivery stroke, this slow response time always leads to at least a small quantity of fluid being delivered as the pressure-limiting valve 100 is usually slower to respond than the inlet valve. As a result, during the suction phase a small quantity of fluid is suctioned through the inlet valve, while the pressure-limiting valve 100 is closed. During the delivery stroke, conventionally the pressure-limiting valve 100 is hydraulically locked so that the pressure is not able to drop.

The pressure-limiting valve 100 comprises the holding device 106. Said device always holds the pressure limiting valve 100 in the open position if a fault occurs with a pump delivery at one hundred percent. Thus an operation of the internal combustion engine is possible, even in the case of a fault. As pressures above the predetermined opening pressure of the pressure-limiting valve 100 are avoided, expensive high-pressure components may be dispensed with. The pressure-limiting valve 100 is able to be produced in a simple and cost-effective manner. An operation where no current pressure information is available is avoided. As a result, injection quantities which are incorrect and/or too high are avoided.

According to further embodiments, the specified distance 107 is predetermined such that the holding device holds the sealing body 105 even in the case of other faults in the high pressure pump 201. For example, the holding device 106 already holds the sealing body 105 at a 99% pump delivery of the high pressure pump 201.

What is claimed is:

1. A pressure-limiting valve for a fuel injection system comprising:
    a housing having a fluid inlet and a fluid outlet,
    a sealing seat and a sealing body configured to move between a closed position in contact with the sealing seat blocking a fluid flow from the fluid inlet to the fluid outlet, and additional positions that permit such fluid flow,
    a spring exerting a spring force against the sealing body in the direction of the sealing seat, and
    a holding device configured to maintain the sealing body in one of the additional positions against the spring force when the sealing body is moved at least a specified distance away from the sealing seat, the holding device comprising resiliently deflectable levers engaging in a groove of the sealing body to hold the sealing body in the one of the additional positions for a specific time interval and then releases the sealing body,
    wherein the specified distance is predetermined as a function of a maximum admissible pressure for the fuel injection system.

2. The pressure-limiting valve of claim 1, wherein the holding device is configured to hold the sealing body mechanically in the additional position.

3. The fuel injection system of claim 1, further comprising a fuel collection line hydraulically coupled to the high pressure region of the high pressure pump.

4. A fuel injection system, comprising:
    a pressure limiting valve comprising:
    a housing having a fluid inlet and a fluid outlet,
    a sealing seat,
    a sealing body configured to move between a closed position in contact with the sealing seat blocking a fluid flow from the fluid inlet to the fluid outlet, and additional positions that permit such fluid flow,
    a spring exerting a spring force against the sealing body in the direction of the sealing seat, and
    a holding device configured to maintain the sealing body in one of the additional positions against the spring force when the sealing body is moved at least a specified distance away from the sealing seat, wherein the specified distance is predetermined as a function of a maximum admissible pressure for the fuel injection system,
    the holding device comprising resiliently deflectable levers engaging in a groove of the sealing body to hold the sealing body in the one of the additional positions for a specific time interval and then releases the sealing body, and
    a high pressure pump having a pump chamber arranged hydraulically between a high pressure region and a low pressure region, wherein the pressure-limiting valve is connected hydraulically to the high pressure region by the fluid inlet.

5. The fuel injection system of claim 4, wherein the fluid outlet of the pressure-limiting valve is hydraulically connected to the pump chamber.

6. The fuel injection system of claim 4, wherein the fluid outlet of the pressure limiting valve is connected hydraulically to the low pressure region.

7. The fuel injection system of claim 4, wherein the holding device of the pressure limiting valve holds the sealing body mechanically in the additional positions.

* * * * *